May 21, 1935.　　　E. FISCHER ET AL　　　2,002,344
COMMUNICATION CABLE WITH REDUCED MAGNETIC COUPLING
Filed Dec. 8, 1932
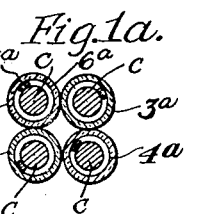
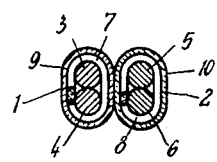
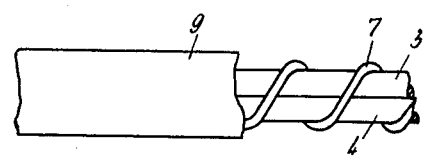
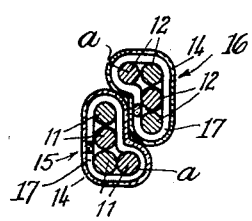
Inventors
Ernst Fischer and
Hans Bantzekow
by Knight Bro
attorneys Patented May 21, 1935

2,002,344

UNITED STATES PATENT OFFICE 2,002,344

COMMUNICATION CABLE WITH REDUCED MAGNETIC COUPLING

Ernst Fischer, Berlin-Lichterfelde/West, and Hans Gantzckow, Berlin-Weissensee, Germany, assignors to Siemens & Halske, Aktiengesellschaft, Siemensstadt, near Berlin, Germany, a corporation of Germany Application December 8, 1932, Serial No. 646,282
In Germany December 12, 1931

6 Claims. (Cl. 179—79)

Our invention relates to communication cables whose conductors are freed from cross-talk interference to an extent required for the operation of the cable with amplifiers.

As it is well known in the art the line attenuation in communication cables cannot be increased at will, since it has not, hitherto, been possible to improve cables of the cross-talk proof type to such an extent as to obtain an operation free of interferences even in the case of co-efficients of amplification which lie above the hitherto employed. This is, however, not due to electrostatic couplings which may, for instance, be reduced in a sufficient manner by metallic shields or the like, but to magnetic couplings which cannot be sufficiently lessened even when adopting complicated methods for the compensation of interferences in communication cables. Even though it were possible to render a communication cable sufficiently cross-talk proof from an electromagnetical point of view such magnetic cross-talk couplings would nevertheless result owing to the necessity of cutting off cable portions when carrying out repair works and cause interferences with high coefficients of amplification.

The principal object of the invention is the lowering of the magnetic coupling between the conductors to practically negligible values. A further object of the invention is the lowering of the magnetic couplings to values which permit an increase of the damping, and thus of the amount of energy which can be transmitted, to values essentially higher than it was possible heretofore.

A further object of the invention is to lower the aforementioned magnetic coupling and to simultaneously avoid or neutralize a disturbing increase in the capacities of the cable.

Lastly, the object of the invention is to provide means for lowering the magnetic coupling only in those portions of the communication channels which are particularly endangered and disturbed by such couplings, and only in portions along the cable in which specific disturbances of the speaking circuits between one another or from outside sources are likely to occur.

The fundamental idea underlying the invention resides in dividing each core of a twin core into two or more divisional conductors, and in stranding together those divisional conductors of the twin core which together form a communication channel in such a manner that either the diagonally oppositely located or the directly adjacent divisional conductors form in the stranded cable one of the cores of the twin-core cable. By "communication channel" is to be understood a constituent portion of the cable which in two-wire operation contains both signalling directions, and which in four-wire operation contains only one signalling direction. In case carrier frequencies are employed it is, of course, possible to transmit several carrier frequencies through the same channel.

The reduction of the magnetic coupling between the several communication channels to negligible values is, therefore, attained according to the invention not by means of special electro-magnetic screens—though such screens may be additionally used if desired—but by arranging the conductors in the communication channels so that the fields produced by the divisional conductors are mutually neutralized, so that the twin-core cables or channels thus produced are magnetically practically neutral so far as their effect from or toward the outside is concerned. The two or more divisional conductors, which are joined together to form one of the constituent cores, are electrically connected in parallel with one another. The electrical connections necessary for this purpose may be made at the ends of each cable length or in addition also at several intermediate places in a manner known in the art for connecting several strands electrically in parallel with one another. The static coupling which the art heretofore was able to prevent much easier than the magnetic coupling may be avoided also in the cable according to the present invention by providing conventional shields with sufficiently low resistance.

Long distance communication cables and arrangements for such cables in which both signalling directions consist of two parallel connected divisional conductors are known in the art, but in these prior art arrangements and connections, the communication channels are not constructed so that they consist of divisional conductor elements which mutually neutralize their magnetic effects so that stray fields into their surroundings are avoided. Consequently, the advantages which accrue to a cable according to the present invention are not present in the prior art cables with parallel conductors. For instance, these advantages do not accrue in the so-called phantom circuits in which from the four conductors of a quad three communication channels are formed by means of transformers. Neither do these advantages accrue in the well-known extension cables which have for each core of the main cable to be extended two or more conductors insulated from one another, and twisted together according to the method of Dieselhorst-Martin or which are constructed as double star cables.

The invention may be reduced to practice in several different ways. A number of these modifications are described in the following with the aid of the accompanying drawing, in which—

Fig. 1ª shows in cross-section a communication channel in the form of a well-known star quad.

Fig. 1 shows in cross-section a different conductor arrangement in the communication channel consisting of four divisional conductors differently arranged relatively to each other.

Fig. 2 shows a side view of the channel shown in Fig. 1, and in which the insulation is partly removed, and Figs. 3 and 4 show in cross-section two further modifications of a communication channel, composed of several cores comprising in all eight divisional conductors, and wherein four of these conductors are arranged in each of the twin cores, comprising the channel, in certain configurations to attain the purpose of the invention.

The quad shown in Fig. 1ª consists of the conventional individual conductors 1ª, 2ª, 3ª and 4ª, the copper elements $c$ of which are individually surrounded by a spiral paper cord 5ª and one or several layers of paper tape 6ª. While in the prior art arrangement these four conductors would form at least two, but generally three communication channels, for instance by joining conductors 1ª and 4ª together in the first channel, the conductors 2ª and 3ª in the second channel, and all four conductors in a so-called "phantom" circuit into the third communication channel, the four conductors 1ª, 2ª, 3ª and 4ª form according to the present invention only one single communication channel. In this arrangement each pair of diagonally opposed conductors of the quad form one core of the twin core cable. In other words, the individual conductors of the quad which were independent in the prior art arrangements are now made divisional conductors so that for instance conductors 1ª and 4ª together and 2ª and 3ª together form electrically one core in the communication channel which comprises the two cores. These four divisional conductors, being located at the corners of a square form magnetically a completely symmetrical system, so that toward the outside they exert practically no magnetic effects, whereby the magnetic couplings between several adjacent communication channels are removed entirely, or at least diminished to a negligible value. This desirable lack of coupling remains also in case appreciable masses of metal, for instance the lead sheath or the armoring of the cable are located in the vicinity of such a quad. Outside magnetic fields induce in all four divisional conductors 1ª, 2ª, 3ª and 4ª practically only voltages of the same value, so that no disturbing equalizing currents can flow in the several conductors of the communication channels. This advantage also prevails in cables which have separated speaking directions, for instance in double bundle cables. Also in this case each pair of diagonally opposed divisional conductors of the quad forms a core. Since owing to this symmetrical arrangement outside disturbing fields may induce only voltages of the same value, no potential differences are produced and, therefore, no equalizing currents, which may disturb the transmission can flow. Such cables are, therefore, free from outside disturbances. Since in twisting the cable, as is well-known, the form of a quad remains practically intact, cables according to the present invention are not subject to appreciable coupling effects through a dislocation of the cores.

If each core of a twin core is divided into two divisional conductors and the four divisional conductors are stranded to form a spiral quad as described with reference to Fig. 1ª, namely, so that each pair of diagonally opposed divisional conductors forms a core of the twin core, an arrangement is obtained which owing to the symmetrical disposition of the cores is insensitive to a high degree to interfering magnetic fields. In some cases, the capacities of the speaking circuits are, however, relatively high, so that the range of transmission and the transmitting properties of the cable might be impaired, particularly in the case of long stretches of submarine cable. It is, therefore, advisable in such cases to also divide each core of a twin core into two or more divisional conductors, the divisional conductors of the twin core being, however so twisted into a stranded element that each group of two or more adjacent divisional conductors in each stranded element form each a core of the twin-core cable. For instance in Fig. 1ª conductors 1ª, 2ª, and conductors 3ª, 4ª respectively are assembled into a core.

Although the magnetic symmetry in the last-described arrangement of the conductors is somewhat impaired, and magnetic couplings may occur to a greater extent than is the case with the first-described arrangement shown in Fig. 1ª, the immunity from magnetic and electrostatic interfering fields for all of practical cases is nevertheless sufficient, since those divisional conductors of the twin-core cables which form a speaking circuit, lie still sufficiently close together so that the loop formed by these conductors has a narrow width. This disadvantage of slightly increased coupling may be entirely disregarded in view of the advantage of lower capacities of the speaking circuits in cases where low capacity is of importance.

Figs. 1 and 2 show a detail development of the last-mentioned modification, in which for the purpose of diminishing the thickness of the core element, its appertaining divisional conductors are not individually insulated, but surrounded by a common insulation.

Fig. 1 shows a twin core cable element, constituting a communication channel, whose individual cores 1 and 2 consist each of divisional conductors 3, 4 and 5, 6 respectively. Spacers 7 and 8 spirally wound around each pair of divisional conductors consist of paper cord or the like. Over these spacers insulating sheaths 9 and 10 are wound. In addition to providing the appertaining divisional conductors with a common insulation they may also be individually insulated.

Fig. 2 shows a side view of individual core element 1 of the twin core with the insulating sheath 9 partly broken away.

From the aforedescribed second modification of the invention may be developed the modifications shown in Figs. 3 and 4, which are based on the fundamental idea of imparting to the individual cores of the twin core such a cross-sectional form that as few lines of force as possible can stray to the outside, and that vice versa outside disturbing magnetic fields may affect the cores only to a very slight extent, without losing in these modifications the advantage of low capacity.

As Figs. 3 and 4 show this advantage may be attained by the particular relative arrangement of a larger number of divisional conductors within the core element. In Fig. 3 the twin core comprising a communication channel consists of two constituent cores 15 and 16, each of which in turn comprises a group of four electrically parallel connected divisional conductors 11 and 12 respectively. Each of these conductor groups is surrounded by a paper cord winding 17 similar to winding 7 or 8 of Fig. 1. A paper tape winding 14 finally surrounds each core 15 and 16. The relative arrangement of the group of parallel divisional conductors is made, however, so that one of the end conductors marked with $a$ in Fig. 3 is laterally displaced out of the straight parallel alignment, and is placed beside the next adjacent conductor. In the two cores 15 and 16 the conductors $a$ of opposite ends are thus displaced so that the cross-sectional shape of the twin core cable is composed of two L-shaped cores, fitted into one another to form a twin core cable of substantially rectangular cross-section. Due to such an arrangement the magnetic lines of force close in on the conductors in shorter arcs than is possible with an arrangement of the divisional conductors in a straight line for instance as shown in Fig. 1.

As Fig. 4 shows, the divisional conductors 21 and 22 of the two cores are placed side by side in a curved line. Each group is wound with a paper cord and a paper ribbon 14 the same as in Fig. 3. By this arrangement two cores of bean-shaped cross-section are formed which, when placed each with one of its edges into the concave portion of the other core, constitutes again a configuration by which stray fields are avoided in the manner described. In general the configuration of the divisional conductors of which Figs. 3 and 4 give example, depends aside from magnetic considerations also upon practical manufacturing conditions and the adaptability of such a configuration for twisting into a well-shaped cable.

All or only the endangered speaking circuits of the cable may be designed according to the invention, depending upon the requirements of the cable. In cables consisting of two bundles of wires shielded by conductive shields employed in four-wire operation, i. e., such cables in which the cores of one speaking circuit lie in one half and the cores of the other speaking circuit in the other half of the cable, it is only necessary to design according to the invention the incoming speaking circuit that is the circuit which has the lowest level, since the magnetic coupling for the outgoing speaking circuit is thereby sufficiently reduced and since the incoming speaking circuit is only sensitive to external interferences. Even in the case of cables operated in other ways, only the twin cores or portions thereof which are exposed to interfering causes by reason of adjacent cores or to exterior causes, need according to circumstances be constructed according to the invention. It is of particular advantage to design the end lengths of the cable, particularly the cores of the incoming speaking circuit according to the above-described arrangement, i. e., to arrange the divisional conductors of the individual cores of a twin core in diagonally opposite angles of the quad as shown in Fig. 1ª.

While the capacity of the twin cores constructed according to the present invention is somewhat larger than the capacity of the commonly constructed twin cores which may in addition be contained in the entire cable assembly, it is advisable in order to obtain uniform coil spacing and uniform capacities of the coil fields, to considerably reduce the divisional conductor diameters of the twin cores according to the present invention in order to thereby reduce the capacity, for instance in four wire cables, or in carrier frequency cables, or in cables for radio broadcast transmission. In many cases it may already be sufficient to only construct the two ends of long submarine cables according to the invention to a length which would procure a sufficient damping (approximately three Nepers), and to construct the remaining intermediate cable portion as a bundle or layer cable with the ordinary conventional twin cores. This may bring about the advantage of a general reduction of the damping, in other words, it may be possible to either bridge longer distances or to use smaller cross-sections.

It is of great advantage to use for the end lengths of the cables, in particular for the incoming speaking direction, the modification of the invention shown in Fig. 1ª, that is to say to arrange the divisional conductors of the cores of a twin core cable on diagonally opposed corners of a quad square. In this manner the great insentiveness of such a completely symmetrical arrangement to magnetic influences can be taken advantage of at the particularly endangered cable ends in an amplifier field. For the intermediate lengths of the cable might be used one of the other modifications of the invention which has lower capacity values, and thus the total capacity of the cable may be maintained at a low value. In some cases it may be of advantage, for instance in case of sea cables or long land cables to use for the terminal ends of the cable for a certain distance the modification shown in Fig. 1ª, for the next following cable portions and over a certain length one of the other modifications shown, and for the central length of the cable, for instance the portions of a submarine cable which are in deep water, the heretofore customary conductor arrangement.

We claim as our invention:—

1. A cross-talk proof communication cable having twin cores, at least one of said twin cores forming only one single communication channel of the cable installation, and having each of its component core elements divided into a plurality of divisional conductors and twisted with the divisional conductors of the component core element to form a magnetically closed conductor system for preventing magnetic lines of force from straying from one communication channel into an adjacent channel.

2. A cross-talk proof communication cable having twin cores, at least one of said twin cores forming only one single communication channel of the cable installation, and having for a substantial length of the cable from either end, each of its component core elements divided into a plurality of divisional conductors, and twisted with the divisional conductors of the component core element to form a magnetically closed conductor system for diminishing the stray of magnetic lines of force from one communication channel into an adjacent channel.

3. A cross-talk proof communication cable having a plurality of twin cores, at least one of said twin cores forming only one single communication channel of the cable installation, and having each of its constituent core elements divided into two divisional conductors, the four divisional conductors of the twin core being twisted together to form a spiral quad, each pair of diagonally oppositely disposed divisional conductors of said quad being electrically connected in parallel and comprising one core element of the twin core, to form a magnetically closed conductor system.

4. A cross-talk proof communication cable having twin cores, at least one of said twin cores forming only one single communication channel of the cable installation, the incoming channel at either cable end having, for a substantial cable length from the end, each of its component core elements divided into a plurality of divisional conductors and twisted with the divisional conductors of the component core element to form a magnetically closed conductor system for diminishing the stray of magnetic lines of force from one communication channel into an adjacent channel.

5. A cross-talk proof communication cable having twin cores, at least one of said twin cores forming only one single communication channel of the cable installation, and having each of its component core elements divided into two physically parallel divisional conductors, electrically connected in parallel and jointly insulated from the divisional conductors of the component core, the divisional conductors of the entire twin core being twisted together to form a magnetically closed conductor system for diminishing the stray of magnetic lines of force from one communication channel into an adjacent channel.

6. A cross-talk proof communication cable having twin cores, each twin core forming one of the communication channels, at least one of said twin cores having each of its component core elements divided into a plurality of divisional conductors and twisted with the divisional conductors of the component core element to form a magnetically closed conductor system for preventing magnetic lines of force from straying from one communication channel into an adjacent channel, the twin cores of the two channels being separated in space for an appreciable portion of the total cable length.

ERNST FISCHER.
HANS GANTZCKOW.